United States Patent [19]

King

[11] Patent Number: 4,507,193

[45] Date of Patent: Mar. 26, 1985

[54] MECHANISM FOR RECOVERING AND COLLECTING EXTRACTED POLAR LIQUIDS

[76] Inventor: Arthur S. King, 8021 Cherokee, Leawood, Kans. 66206

[21] Appl. No.: 637,885

[22] Filed: Aug. 6, 1984

[51] Int. Cl.$^3$ ............................................... B03C 5/02
[52] U.S. Cl. .................................................... 204/302
[58] Field of Search ............................... 204/302–308, 204/186–191

[56] References Cited

U.S. PATENT DOCUMENTS

| | | | |
|---|---|---|---|
| 2,116,509 | 5/1938 | Cottrell | 204/188 |
| 3,197,394 | 7/1965 | McEuen | 204/302 |
| 3,857,770 | 12/1974 | Keller | 204/188 |
| 4,233,134 | 11/1980 | King | 204/186 |

Primary Examiner—Thomas Tufariello
Attorney, Agent, or Firm—Schmidt, Johnson, Hovey & Williams

[57] ABSTRACT

Polar liquids which have been extracted from solution under conditions of a negative pressure environment may be continuously drawn off using a system of holding tanks and control circuitry that overcomes the tendency for the extracted liquid to remain in the subatmospheric environment without risking loss of such environment. A pair of intermediate holding tanks of the system are alternately filled and depleted so that one is filling while the other is discharging to a final point of collection, and the valving arrangements with respect to each holding tank are such that during the time a holding tank is accepting liquid from the extractor, such tank is communicated with the subatmospheric environment associated with the extractor whereby to equalize the pressures between those two systems and enable the liquid to drain freely into the selected holding tank. In order to discharge held liquids from a holding tank, such tank is communicated with the atmosphere after first blocking communication thereof with the subatmospheric extractor.

5 Claims, 2 Drawing Figures 4,507,193

MECHANISM FOR RECOVERING AND COLLECTING EXTRACTED POLAR LIQUIDS

TECHNICAL FIELD

This invention relates to the extraction of polar liquids from solution through electric means and, more particularly, to a system for removing and collecting such extracted liquids from a subatmospheric environment within which the extraction occurs without adversely effecting the subatmospheric nature of such environment.

BACKGROUND

An extractor as shown in U.S. Pat. No. 4,233,134, Titled "METHOD AND APPARATUS FOR EXTRACTING POLAR SUBSTANCES FROM SOLUTION", has a provision for temporarily accumulating and collecting a relatively small supply of extracted liquid. No means are provided, however, to remove the accumulation out of the subatmospheric environment within which the extraction process is occurring. In this respect, if the collecting receptacle is to be periodically withdrawn from the subatmospheric environment and emptied, it becomes necessary to periodically destroy the subatmospheric condition of the environment within which the extraction occurs, and to then restore such subatmospheric environment after the emptied receptacle has been replaced.

SUMMARY OF THE PRESENT INVENTION

Accordingly, one important object of the present invention is to provide a way of continuously removing extracted liquid from the subatmospheric environment, instead of doing so on a batch basis, and removing such liquid in a manner that does not adversely effect the integrity of the negative pressure established within the extractor.

In this respect, the present invention contemplates removing the extracted liquid to an intermediate holding tank stage during which the holding tank is carefully sealed and maintained in open communication with the extractor environment so that both the holding tank and the extractor can be maintained at equal pressure levels. This permits the liquid to drain out of the extractor instead of being held therein by the negative pressure of such system. Then, when the holding tank is itself to be discharged, communication between the tank and the extractor is terminated, the holding tank is exposed to the atmosphere, and the drain valve is opened to enable the holding tank to actually discharge its contents.

In actual practice, in order to provide a continuous operation, it has been determined attractive to have two separate holding tanks in use at all times, one of which is filling with liquid and the other of which is discharging its collected load. A control system associated with such holding tanks automatically switches from one of the tanks to the other for collection purposes when the one tank is filled, whereupon the filled tank can be isolated atmospherically from both the other tank and the extractor to open itself to the atmosphere and discharge its contents.

DETAILED DESCRIPTION

Figure 1:
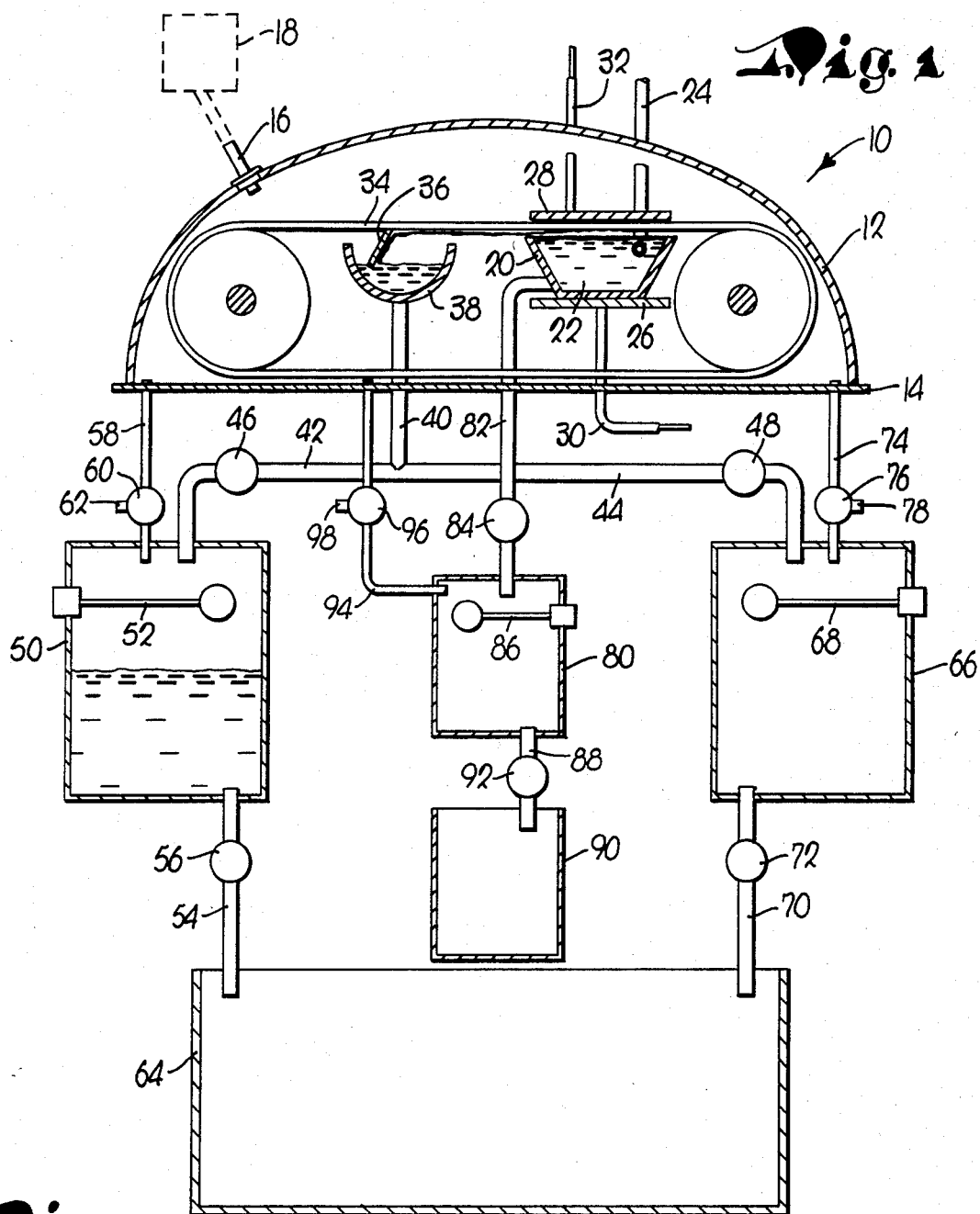
FIG. 1 is a schematic illustration of a recovery and collecting system for subatmospherically extracted liquids, such system being constructed in accordance with the principles of the present invention.

The extractor 10 includes a dome or housing 12 covering a platform 14 on which other components of the apparatus may be situated. The interface between the dome 12 and the platform 14 is hermetically sealed, and a fitting 16 communicates the interior of the dome 12 with a source 18 of vacuum pressure for reducing the pressure beneath the dome 12 to subatmospheric levels.

In accordance with the teachings of U.S. Pat. No. 4,233,134 the extractor 10 further includes a receptacle 20 of dielectric material containing a supply of solution 22 to be treated. A pipe 24 passing through the dome 12 serves as a source of supply for the receptacle 20 in order that the latter may be continuously maintained at a preselected level.

The receptacle 20 is disposed between a pair of oppositely charged electrodes 26 and 28 having respective leads 30 and 32 which are connected to opposite sides of a source of electrical potential whereby to establish an electric field between the electrodes 26 and 28. The upper electrode 28 is positioned as close as possible to the surface of the solution 22 without physically touching the same, and during excitation of the polar molecules within the solution 22 as a result of the presence of the electric field, such molecules migrate toward the electrode 28. In the illustrated embodiment, a dielectric, continuous collecting belt 34 is inserted between the uppermost surface of the solution 22 and the underside of the electrode 28 in close proximity to the surface of solution 22 for the purpose of causing the migrating polar molecules to adhere onto the belt 34 instead of the upper electrode 28. Such belt 34 is in turn scraped free of the adhered liquid by a scraper 36 which causes the liquid to be diverted into a receptacle 38.

A drain line 40 from the receptacle 38 splits into a pair of separate drain lines 42 and 44 below the platform 14, the line 42 being provided with a drain valve 46, and the line 44 being provided with a similar drain valve 48. Line 42 leads to the upper end of a sealed container or holding tank 50 provided with a float control switch 52 and a discharge line 54 provided with a discharge valve 56. Holding tank 50 also has a conduit 58 leading from the top thereof to the interior of the extractor 10 through the platform 14. A valve 60 in the conduit 58 is operable to open and close the latter so as to establish and interrupt communication between the tank 50 and the extractor 10. A vent port 62 associated with the valve 60 opens that portion of conduit 58 below valve 60, as well as the upper region of the holding tank 50, to the atmosphere when valve 60 is in a position closing conduit 58. The lowermost end of the discharge line 54 leads to a storage tank 64.

Similarly, the drain line 44 leads to a second container or holding tank 66 which is fully sealed hermetically. A float switch 68 is disposed within the tank 66, and a discharge line 70 leads from the bottom thereof, opening and closing of which is controlled by a discharge valve 72. Discharge line 70 dumps into the storage tank 64 as illustrated. At the upper end of the holding tank 66, a conduit 74 communicates the latter with the interior of the extractor 10 through the platform 14 as controlled by a valve 76. When the latter is open, such communication is permitted, while when the valve 76 is closed, such communication is prevented and a vent port 78 establishes communication of the upper end of the holding tank 66 with the atmosphere.

In between the two holding tanks 50 and 66 is disposed a third holding tank 80 for brine or other residue left in the bottom of the receptacle 20 of the extractor 10. In this respect, a drain line 82 from the bottom of the receptacle 20 passes downwardly through the platform 14 and into the upper end of the holding tank 80, such line 82 being controlled by a drain valve 84. A float switch 86 is provided within holding tank 80, and a discharge line 88 at the bottom of the latter leads to a storage tank 90. A discharge valve 92 opens and closes the discharge line 88. A conduit 94 from the top of the holding tank 80 leads to the interior of the extractor 10 through the platform 14 and is controlled by a valve 96 which, in its open position, establishes communication between the subatmospheric pressure of the extractor 10 and the upper end of the holding tank 80 and in its closed position prevents such communication while also communicating the upper end of the tank 80 with the atmosphere through a vent port 98.

OPERATION

Broadly speaking, the concept involved is for liquid to be continuously drained out of the receptacle 38 into alternate ones of the holding tanks 50, 66. When one is full, the system automatically switches over to begin filling the other, and the filled tank then begins to empty itself into the main storage tank 64. In each case, in order for one of the holding tanks to commence filling, the pressure level in that tank must first be equalized with the subatmospheric pressure existing within the extractor 10. Otherwise, the liquid within receptacle 38 will simply not flow into the holding tank.

Thus, using the holding tank 50 as an example, when filling thereof is commenced, the discharge valve 56 is closed, the drain valve 46 in line 42 is opened, and the pressure valve 60 in conduit 58 is open. Holding tank 50 becomes sealed off from the atmosphere while at the same time communicated with the subatmospheric conditions existing beneath the dome 12, thereby equalizing the levels of pressure between the two structures. Liquid may then flow out of the receptacle 38 through line 40 and line 42 into the holding tank 50.

During the time that holding tank 50 has been filling, the holding tank 66 has been allowed to drain. In this respect, the drain valve 48 in line 44 has been closed so that no further liquid from the receptacle 38 may drain into the holding tank 66. Similarly, the pressure valve 76 has been closed to prevent any further communication between the subatmospheric condition under the dome 12 and the holding tank 66. In fact, by closing the pressure valve 76, the tank 66 is communicated with the atmosphere via the vent port 78 such that, when the discharge valve 72 is opened in discharge line 70, the contents of holding tank 66 may flow out through line 70 into the main storage tank 64.

It is quite likely that the holding tank 66 will be fully discharged prior to the time that the other holding tank 50 becomes filled. This is of no particular consequence, however, and the discharge valve 72 simply remains open, while the drain valve 48 and the pressure valve 76 remain closed until once again automatically actuated.

In the respect, as the holding tank 50 nears a filled condition, the float switch 52 comes into play. Once float switch 52 is actuated, several events take place simultaneously. First, the drain valve 46 in line 42 closes so that no further liquid enters the holding tank 50, and drain valve 48 in line 44 opens to commence filling the holding tank 66, the discharge valve 72 also closing at this time. Pressure valve 76 opens to communicate the holding tank 66 with the subatmospheric pressure in the extractor 10, whereupon the liquid from receptacle 38 may now gravitate into the holding tank 66 and begin filling the same. Also, the pressure valve 60 in conduit 58 closes to prevent further communication between the holding tank 50 and the extractor 10, and this has the effecting of admitting ambient air to the holding tank 50 via the vent port 62, whereupon opening of the discharge valve 56 permits the liquid to be discharged from holding tank 50 and into the primary storage tank 64.

This type of alternate filling and discharging of the two holding tanks 50, 66 is carried on continuously such that liquid may be continuously discharged from the receptacle 38 within the extractor 10. In this manner, there is no need to periodically shut down the system and dump the contents of the receptacle 38 as would be true in a batch-type process.

Brine or other liquid residue may be drained from the receptacle 20 through a two-stage system that functions substantially similarly to each of the holding tank systems. However, only a single holding tank 80 is utilized because of the relatively low volume of residue that will need to be drained off compared to the volume of extracted liquid in need of handling.

In this respect, it will be noted that with the discharge valve 92 closed, the brine holding tank 80 may be filled by opening the drain valve 84 in line 82 and the pressure valve 96 in conduit 94. This has the effect of equalizing the pressures within the tank 80 and the extractor 10 so that the liquid may actually leave the receptacle 20 and enter the holding tank 80. In order to thereafter dump the contents from holding tank 80, the pressure valve 96 is closed, preventing atmospheric pressure from entering the extractor 10 but allowing the same to communicate with the holding tank 80, the drain valve 84 is likewise closed, and the discharge valve 92 is opened, whereupon the contents may empty into a collecting tank 90. It is contemplated that the brine or other residue within the receptacle 20 will only be emptied therefrom periodically, rather than continuously, such that suitable timing means or the like could be provided to regulate this process.

Figure 2:
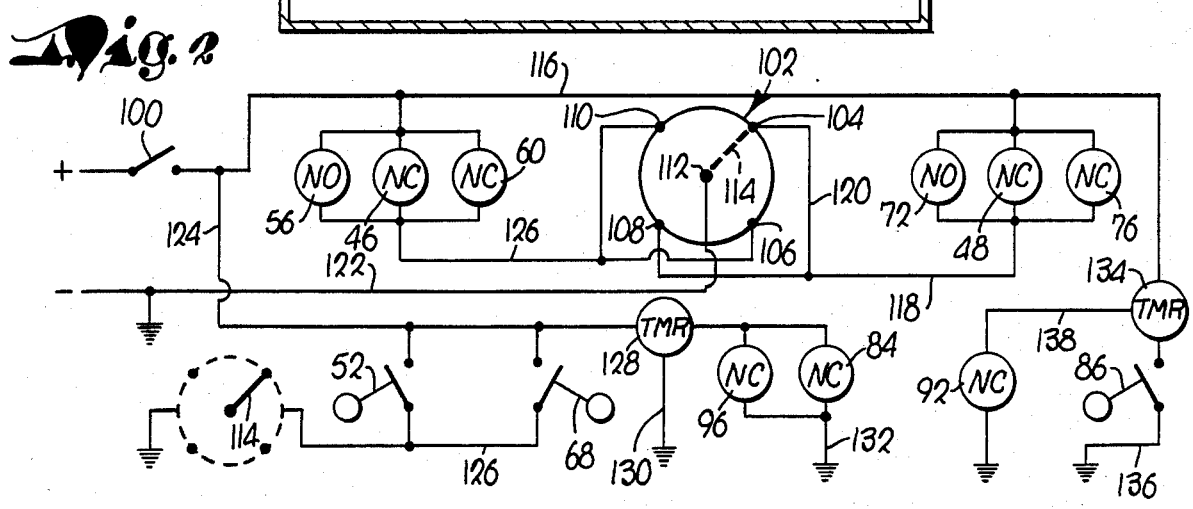
FIG. 2 is an electrical schematic diagram showing the various controls and valves for operating the system.

FIG. 2 shows a suggested electrical circuit arrangement which might be utilized in achieving the various sequence of operations above described with respect to the collecting mechanism for the extractor 10. In order to energize the entire system, a main switch 100 may be closed. Although not shown in FIG. 1, FIG. 2 shows a multi-position switch 102 having a series of four separate contacts 104, 106, 108, and 110 all utilizing a common ground 112, depending upon the position of a switch member 114 shown in broken lines in the top portion of the schematic diagram and in solid lines in the lower left hand portion thereof. The movable switch member 114 is driven by a suitable solenoid or relay device not illustrated, and during each actuation thereof moves from one of the contacts 104, 106, 108, and 110 to the next such contact in order to complete a circuit path and thereby actuate one or more of the control valves of the system.

In this respect, assuming the member 114 to be in a position making contact between ground 112 and contact point 104, when the main switch 100 is closed, such will have the effect of establishing a complete circuit along a path that includes a lead 116, the valves 48, 72, and 76, a lead 118, a lead 120 to contact 104, the switch member 114, the ground contact 112, and a lead 122. This has the effect of opening the normally closed drain valve 48, closing the normally open discharge valve 72, and opening the normally closed pressure valve 76. The holding tank 66 thus begins to fill, during which time the normally closed drain valve 46 associated with the holding tank 50 does indeed remain closed, as does also the pressure valve 60 inasmuch as that portion of the circuit path associated with those valves remains unactuated at this time.

As the holding tank 66 fills, the liquid reaches the float switch 68 which rises and completes a circuit path including a lead 124, the switch 68, and a lead 126. Consequently, this causes the actuator associated with the switch member 114 to shift the latter to the next position in its cycle, bridging the common ground contact 112 and positive contact 106, establishing a new completed circuit path and opening that path previously associated with the holding tank 66 for filling the latter. Consequently, the drain valve 48 closes, as does the pressure valve 76, while the discharge valve 72 opens to dump the contents of holding tank 66 into the primary tank 64.

The new circuit path established by virtue of the switch member 114 bridging contacts 112 and 106 includes the lead 116, the switches 46, 56, and 60, a lead 126, and the lead 122. It will be seen that this completed circuit path has the effect of closing the normally open discharge valve 56, opening the normally closed drain valve 46 and likewise opening the normally closed pressure valve 60 such that liquid may thereupon be drained from the receptacle 38 through the drain line 42 and into the holding tank 50. It will also be appreciated that, with respect to the holding tank 66, once the liquid level therein begins to drop due to the fact that such tank has been in its drain cycle, the float switch 68 associated therewith likewise opens so that the switch member 114 is not rotated on around to a further contacting position beyond that bridging the contact 112 and 106.

The tank 50 continues to fill until its float switch 52 is actuated by the liquid level therein, this closing a circuit path that includes the leads 116, 124, switch 52, and lead 126, causing the switch member 114 to be driven by its actuator to the next position bridging contacts 112 and 108. As soon as the switch member 114 moves out of its bridging relationship with the contacts 112 and 106, the normally closed pressure valve 60 closes, the normally open discharge valve 56 opens, the normally closed drain valve 46 closes, and the contents of holding tank 50 begin to discharge into the primary tank 64. As soon as such water level drops sufficiently, the float switch 52 likewise opens to prevent further actuation of the switch member 114.

Simultaneously with the actuation of the filling process associated with holding tank 50, the holding tank 66 is prepared for refilling by virtue of the circuit path established along lead 116, valves 48, 72, and 76, lead 118, contact 108, switch member 114, contact 112, and lead 122. This cycle continues uninterruptedly as the switch member 114 is periodically moved into a new contacting circuit-closing position.

With respect to the brine holding tank 80, when the main switch 100 for the control circuit is closed, this energizes a timer 128 via a circuit path including leads 116, 124, timer 128, and lead 130. The timer 128 controls opening of the drain valve 83 and pressure valve 96 which are both normally closed. At such point in time as determined by the timer 128, the timer 128 actuates the valves 84 and 96 by completing a circuit path that includes the lead 116, and lead 124, the timer 128, the valves 84, 96, and the ground lead 132. Thus, the brine or other residue within the receptacle 20 is thereupon allowed to drain to the holding tank 80 wherein the normally closed discharge valve 92 remains unactuated and closed.

Once the level of liquid rises sufficiently within the holding tank 80 to actuate the float switch 86, another timer 134 is energized via the circuit path that includes lead 116, timer 134, float switch 86, and ground lead 136, thus completing the circuit to the normally closed valve 92 via an additional lead 138 whereby to open such discharge valve 92 and allow the contents of holding tank 80 to dump into receptacle 90. Although not illustrated in the circuit schematic of FIG. 2, it will be appreciated that the float switch 86 also has a functional relationship with the control valves 84 and 96 such that the discharge 92 may not be opened until the drain valve 84 and the pressure valve 96 are first closed.

From the foregoing it will be appreciated that a system has been illustrated for essentially continuously draining and collecting extracted liquid from a subatmospheric environment without impairing the continuous operation of the extractor or the subatmospheric pressure level under which it works. While only a single embodiment of such mechanism has been herein illustrated and described, it will be appreciated that various minor modifications within the scope of the present invention could be made by those skilled in the art without departing from the gist and spirit of the present invention.

I claim:

1. In combination with apparatus for extracting polar liquids from solution, said apparatus including a receptacle for such liquids and a vacuum chamber housing said receptacle and connectable to a source of negative pressure for maintaining the area within said chamber at a pressure level below atmospheric pressure, mechanism for recovering and collecting liquid from said receptacle comprising:

a container;

a drain line leading from said receptacle to said container;

a drain valve in said line operable when open to open said line and when closed to close said line;

a vacuum line leading from said housing to said container;

a pressure valve in said vacuum line operable when open to communicate the housing with the container whereby to equalize the pressures therein and operable when closed to prevent communication between the housing and the container and to communicate the container with the atmosphere; and discharge means coupled with the container and operable when open to permit discharge of collected liquid from the container and operable when closed to prevent said discharge.

2. In the combination as claimed in claim 1; and control means operably interconnecting said drain valve, said pressure valve and said discharge means for maintaining said pressure valve and the drain valve closed when said discharge means is open and for maintaining said pressure valve and the drain valve open when said discharge means is closed.

3. In the combination as claimed in claim 2, wherein said drain valve and discharge means are electrically actuatable between said open and closed conditions thereof, said control means including an electrical circuit having switch means for actuating and deactuating said drain valve, pressure valve, and discharge means.

4. In the combination as claimed in claim 3, wherein said switch means is responsive to the level of liquid in said container to effect said actuations and deactuations, said switch means being operable to close said drain valve and said pressure valve and open said discharge means when the liquid in said container reaches a predetermined upper level.

5. In combination with apparatus for extracting polar liquids from solutions, said apparatus including a receptacle for such liquids and a vacuum chamber housing said receptacle and connectable to a source of negative pressure for maintaining the area within said chamber at a pressure level below atmospheric pressure, mechanism for recovering and collecting liquid from said receptacle comprising:

a pair of separate containers;
a pair of drain lines for said containers leading from the receptacle;
a drain valve for each of said drain lines respectively, each of said drain valves being operable when open to open its corresponding drain line and when closed to close the corresponding drain line;
a pair of vacuum lines for said containers leading from said housing;
a pressure valve in each of said vacuum lines operable when open to communicate the housing with the corresponding container whereby to equalize the pressures therein,
each of said pressure valves being operable when closed to prevent communication between the housing and the corresponding container and to communicate the corresponding container with the atmosphere;
discharge means for each container respectively operable when open to permit discharge of collected liquid from the corresponding container and operable when closed to prevent said discharge; and
control means operably coupled with said drain valves, pressure valves and discharge means,
said control means being operable for each of said containers to maintain its pressure valve and the corresponding drain valve closed when the corresponding discharge means is open and to maintain its pressure valve and the corresponding drain valve open when the corresponding discharge means is closed,
said control means being further operable to actuate the valves and discharge means of the two containers in such a manner that one of the containers is filling with liquid while the other is discharging, and vice-versa.

* * * * *